(12) United States Patent
Norman et al.

(10) Patent No.: US 12,074,353 B2
(45) Date of Patent: Aug. 27, 2024

(54) METHODS AND DEVICES FOR REMOVING IMPURITIES FROM ELECTROLYTES

(71) Applicant: LOCKHEED MARTIN ENERGY, LLC, Bethesda, MD (US)

(72) Inventors: Zachariah M. Norman, Belmont, MA (US); Alexander B. Papandrew, Arlington, MA (US); Steven Y. Reece, Lincoln, MA (US); Rachel Christine Klet, Cambridge, MA (US); Matthew Millard, Belmont, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 385 days.

(21) Appl. No.: 17/270,623

(22) PCT Filed: Oct. 23, 2019

(86) PCT No.: PCT/US2019/057537
§ 371 (c)(1),
(2) Date: Feb. 23, 2021

(87) PCT Pub. No.: WO2020/086645
PCT Pub. Date: Apr. 30, 2020

(65) Prior Publication Data
US 2021/0305609 A1    Sep. 30, 2021

Related U.S. Application Data

(60) Provisional application No. 62/749,459, filed on Oct. 23, 2018.

(51) Int. Cl.
*H01M 8/06*    (2016.01)
*H01M 4/86*    (2006.01)
(Continued)

(52) U.S. Cl.
CPC ....... *H01M 8/0693* (2013.01); *H01M 4/8605* (2013.01); *H01M 4/9016* (2013.01);
(Continued)

(58) Field of Classification Search
CPC ...... H01M 8/0693; H01M 8/08; H01M 8/188; H01M 4/8605; H01M 4/8657;
(Continued)

(56) References Cited

U.S. PATENT DOCUMENTS 4,560,453 A    12/1985  Hoffman et al.
4,874,483 A    10/1989  Wakabayashi et al.
(Continued)

FOREIGN PATENT DOCUMENTS

CN    1400333 A    3/2003
CN    103413959 A    11/2013
(Continued)

OTHER PUBLICATIONS

International Patent Application No. PCT/US2019/057537; Invitation to Pay Additional Fees; dated Dec. 17, 2019; 2 pages.
(Continued)

*Primary Examiner* — Karie O'Neill Apicella
(74) *Attorney, Agent, or Firm* — BakerHostetler

(57) ABSTRACT

The present disclosure provides methods and devices for preparing electrolyte solutions containing unwanted impurities at the pg/L levels. The methods generally comprise electrochemically reducing the impurity to a precipitated, plated, or volatilized form, and removing that reduced form from electrolyte solution. This disclosure describes the methods and devices for effecting such methods, and the electrochemical solutions derived or derivable from such methods.

28 Claims, 3 Drawing Sheets

(51) Int. Cl.
| | |
|---|---|
| *H01M 4/90* | (2006.01) |
| *H01M 8/08* | (2016.01) |
| *H01M 8/18* | (2006.01) |
| *H01M 50/414* | (2021.01) |
| *H01M 50/497* | (2021.01) |

(52) U.S. Cl.
CPC ........... *H01M 4/9041* (2013.01); *H01M 8/08* (2013.01); *H01M 8/188* (2013.01); *H01M 50/414* (2021.01); *H01M 50/497* (2021.01); H01M 4/8657 (2013.01); H01M 2300/0002 (2013.01)

(58) Field of Classification Search
CPC ............. H01M 4/9016; H01M 4/9041; H01M 50/497; H01M 50/414
See application file for complete search history.

(56) References Cited

U.S. PATENT DOCUMENTS

| | | | |
|---|---|---|---|
| 5,128,016 | A | 7/1992 | Moment et al. |
| 6,368,488 | B1 * | 4/2002 | Scherson .................. C25B 1/30 204/266 |
| 6,652,819 | B2 | 11/2003 | Shiroto et al. |
| 7,235,169 | B2 | 6/2007 | Nakamura et al. |
| 8,394,529 | B2 | 3/2013 | Keshavarz et al. |
| 8,637,192 | B2 | 1/2014 | Yamamoto et al. |
| 8,852,777 | B2 | 10/2014 | Keshavarz et al. |
| 8,986,862 | B2 | 3/2015 | Park et al. |
| 9,331,356 | B2 | 5/2016 | Dong et al. |
| 9,559,374 | B2 | 1/2017 | Esswein et al. |
| 9,647,290 | B2 | 5/2017 | Sekine et al. |
| 9,768,463 | B2 | 9/2017 | Goeltz et al. |
| 9,837,679 | B2 | 12/2017 | Reece |
| 9,985,311 | B2 | 5/2018 | Dong et al. |
| 2004/0241552 | A1 | 12/2004 | Skyllas-Kazacos |
| 2007/0117013 | A1 | 5/2007 | Hosoya et al. |
| 2010/0143781 | A1 | 6/2010 | Keshavarz et al. |
| 2010/0261070 | A1 | 10/2010 | Keshavarz et al. |
| 2014/0220450 | A1 | 8/2014 | Jilek et al. |
| 2016/0141696 | A1 * | 5/2016 | Tago ..................... C08F 216/14 429/408 |
| 2016/0201206 | A1 * | 7/2016 | Biswal .................... C25B 11/03 136/256 |
| 2016/0233531 | A1 * | 8/2016 | Reece ................. H01M 8/1051 |
| 2016/0248109 | A1 | 8/2016 | Esswein et al. |
| 2017/0229728 | A1 * | 8/2017 | Dong ............... H01M 8/04067 |
| 2018/0102561 | A1 | 4/2018 | Sullivan |

FOREIGN PATENT DOCUMENTS

| | | |
|---|---|---|
| CN | 103441295 A | 12/2013 |
| CN | 105849960 A | 8/2016 |
| CN | 106941186 A | 7/2017 |
| JP | 60-115174 A | 6/1985 |
| JP | 2002-187720 A | 7/2002 |
| JP | 2007-311209 A | 11/2007 |
| WO | 2014/203408 A1 | 12/2014 |
| WO | WO 2015/048074 A1 | 4/2015 |
| WO | WO 2016/149336 A1 | 9/2016 |
| WO | WO 2018/108895 A1 | 6/2018 |
| WO | WO 2019/079047 A1 | 4/2019 |

OTHER PUBLICATIONS

Jie Jiang; "Arsenic redox changes by microbially and chemically formed semiquinone radicals and hydroquinones in a humic substance model quinone"; GEOC 97; The 237th ACS Nat'l Meeting; Mar. 2009; on page.

International Patent Application No. PCT/US2019/057537; Int'l Search Report and the Written Opinion; dated Feb. 19, 2020; 27 pages.

Jiang et al.; "Arsenic Redox Changes by Microbially and Chemically Formed Semiquinone Radicals and Hydroquinones in a Humic Substance Model Quinone"; Environ. Sci. Tech .; vol. 43; 2009; p. 3639-3645 (abstract only).

"Flow battery"; Wikipedia; https://en.wikipedia.org/w/index.php?title=Flow_battery&oldid=864499773; Oct. 2018; accessed Jan. 29, 2020; 13 pages.

An et al.; "The dual role of hydrogen peroxide in fuel cells"; Sci. Bull.; vol. 60; 2015; p. 55-64.

Sato et al.; "Optimization for removal of ruthenium from nitric acid solution by volatilizing with electrochemical oxidation"; Journal of Nuclear Science and Technology; vol. 49; Feb. 2012; p. 182-188.

International Patent Application No. PCT/US2019/057537; Int'l Preliminary Report on Patentability; dated May 6, 2021; 22 pages.

European Patent Application No. 19877020.8; Extended Search Report; dated Jul. 19, 2022; 8 pages.

New Supramolecular Assemblies of Toxic Metal Coordination Complexes by Timothy Glen Carter a Dissertation, Presented to the Department of Chemistry and the Graduate School of the University of Oregon in partial fulfillment of the requirements for the degree of Doctor of Philosophy, Mar. 2010, https://scholarsbank.uoregon.edu/xmlui/handle/1794/10562?show=full.

Matson et al., Heterometal functionalization yields improved energy density for charge carriers in nonaqueous redox flow batteries, J. Mater. Chem. A, 2018,6, 13874-13882 https://doi.org/10.1039/C8TA03312A.

* cited by examiner

METHODS AND DEVICES FOR REMOVING IMPURITIES FROM ELECTROLYTES

CROSS-REFERENCE TO RELATED APPLICATIONS

This application is the U.S. National Stage Application of International Patent Application No. PCT/US2019/057537, filed Oct. 23, 2019 which claims the benefit of U.S. Provisional Patent Application No. 62/749,459, filed Oct. 23, 2018, both of which are incorporated by reference herein.

TECHNICAL FIELD

The present disclosure relates to methods and devices for purifying electrolytes, including electrolytes comprising redox active materials, and the purified electrolytes prepared therefrom.

BACKGROUND

The problems with certain impurities including those comprising arsenic, antimony, tin, and other such metals in redox flow battery systems, and battery systems in general, is well known. For example, U.S. Pat. Nos. 9,647,290 and 9,985,311 and U.S. Patent Application Publication No. 2018/0102561 discuss issues associated with arsenic, antimony, and germanium as precipitating from vanadium flow battery systems, and describe the need to maintain levels of these materials and other metals and metalloids including Cr, Mn, Fe, Co, Ni, Cu, Zn, Mo by selection of raw materials U.S. Patent Application Publ. Nos. 2010/0143781 and 2010/0261070 both describe issues with Hg, Ni, Co, and Cu impurities in iron-chrome-based redox flow battery electrolytes and seek to remedy or avoid problems with these materials using zinc amalgam or other inorganic reductants. These methods appear to be singularly applicable to solutions of iron ions and chromium with an acid.

Few, if any general methods are available for providing such solutions, either in vanadium systems in other systems involving other, more diverse chemistries. In particular, no issues have been previously raised in chemistries involving metal ligand coordination compounds as described herein, nor have any methods been described for reducing these types of impurities in these latter systems.

The present application is directed to addressing these and other problems.

SUMMARY

The present disclosure is directed to methods and devices for reducing impurity levels, and electrolyte solutions derived or derivable from these methods and devices, and batteries, electrochemical cells and/or systems, fuel cells, electrochemical storage systems, and redox flow batteries and flow battery systems incorporating these electrolytes.

Certain embodiments of the present disclosures provide methods for preparing electrolyte solutions having reduced impurity levels, the methods comprising
  (1) electrochemically reducing an impurity, the impurity being present at an initial concentration in an initial electrolyte solution, the initial electrolyte solution further comprising a redox active electrolyte, under conditions sufficient to generate an electrochemically treated electrolyte solution containing a reduced form of the redox active electrolyte and a reduced form of the impurity; and optionally further comprising
  (2) separating the reduced form of the impurity from the electrochemically reduced solution,
  so as to provide a final electrolyte solution having a final concentration of the impurity that is less than the initial concentration of the impurity in the initial electrolyte solution.

In some embodiments, the concentration of the redox active electrolyte in the redox active electrolyte solution is in a range of from 0.5 M to 5 M, or a sub-range thereof.

In certain embodiments, the concentration of the impurity in the final electrolyte solution is at a pre-determined threshold level that is:
  (i) less than about 10 mg of one or more of a given impurity per liter of redox active electrolyte solution ("mg/L"), less than 5 mg/L, less than 2.5 mg/L, less than 1 mg/L, less than 500 µg of one or more of a given impurity per liter of redox active electrolyte solution ("µg/L"), less than 250 µg/L, less than 100 µg/L, less than 50 µg/L, less than about 40 µg/L, less than about 30 µg/L, less than about 20 µg/L, less than about 10 µg/L, less than about 5 µg/L, or less than about 1 µg/L of one or more of a given impurity; or
  (ii) less than about 10 mg of one or more of a given impurity per mole of the redox active electrolyte in the redox active electrolyte solution ("mg/mol"), less than 5 mg/mol, less than 2.5 mg/mol, less than 1 mg/mol, less than 500 µg of one or more of a given impurity per mole of redox active electrolyte ("µg/mol"), less than 250 µg/mol, less than 100 µg/mol, less than 50 µg/mol, less than about 40 µg/mol, less than about 30 g/mol, less than about 20 µg/mol, less than about 10 µg/mol, less than about 5 µg/mol, or less than about 1 µg/mol of one or more of a given impurity in the redox active electrolyte solution. In some embodiments, this is less than 5 µg/L or 5 µg/mol for Sb and As and less than 10 µg/L or 5 µg/mol for Ge and Sn. In some embodiments, the impurity is a form of antimony, arsenic, germanium, tin, or a combination thereof. In other aspects, the impurities may also comprise Hg, Cr, Mn, Fe, Co, Ni, Cu, Zn, or Mo.

The reduced impurity may be separated from the electrolyte solution by plating, precipitation, or volatilization, depending on the nature of the impurity, the nature of the electrolyte solutions (e.g., based on the pH and nature of the accompanying redox active material), and the reducing conditions employed. In certain aspects of these methods, the electrochemical reduction is performed at an oxidation reduction potential that is more negative than the reduction potential of the impurity.

In those embodiments where the reducible impurity provides a volatile reduced impurity upon reduction, for example, wherein the reduced impurities comprise one or more of arsine ($AsH_3$), germane ($GeH_4$), stannane ($SnH_4$), or stibine ($SbH_3$), additional methods further comprise conditioning the electrochemically treated electrolyte solution by one or both of:
  (a) heating the electrochemically treated electrolyte solution, for example at a temperature in a range of from 20° C. to about 105° C.; or
  (b) purging or sparging the electrochemically treated electrolyte solution or the heated solution of (a) using an inert gas, such as nitrogen or argon.

The steps of heating and purging may be provided individually, simultaneously, or sequentially. These operations may be conducted while the conditions of electrochemical reduction are present or absent, preferably so as to minimize or avoid the re-oxidation of the reduced impurities at elevated temperatures.

While any or all of these preceding steps may be done while the electrolyte is already place in a battery, electrochemical cell and/or system, fuel cell, electrochemical storage system, and redox flow battery and flow battery system, in preferred embodiments, these methods are conducted in advance of delivery to such a system, for example, in storage tanks or other vessels, to simplify the operation of the battery, fuel cell, or flow battery.

These electrolyte solutions may be handled and manipulated as provided in the methods thus far described, i.e., wherein the redox active electrolyte is charged in its reduced form, but additional steps may be conducted so as to at least partially discharge the reduced redox active electrolyte, most preferably once all of the reduced impurity is removed.

As such, additional embodiments include those methods further comprising oxidizing the reduced form of the redox active electrolyte in the final electrolyte solution. Such oxidations may be done: (i) using oxidizing gases, such as with gas mixtures comprising air or oxygen; (ii) using oxidizing chemical agents, such as hydrogen peroxides; (iii) electrochemically; or (iv) a combination thereof. It should be appreciated that whatever method is chosen, the choice of oxidation agent should not compromise the integrity of the purified electrolyte solutions, for example by introduction of other impurities.

These methods are generally applicable to most chemical systems, including vanadium or iron-chrome systems, as well as those systems comprising redox active metal ligand coordination compounds, as described elsewhere herein, redox active organic materials, as described elsewhere herein, or combinations thereof.

The present disclosure also embodies the purified compositions derived from or derivable from these methods. That is, and for the avoidance of doubt, the disclosure encompasses those compositions, whether or not actually made by these methods. Such electrolyte solutions include, as independent embodiments, an appropriate redox active electrolyte material at a concentration of at least 0.7 M with impurity levels less than those otherwise described herein. Such impurities, as defined herein as such, may include one or more of As, Ge, Hg, and Sb, and/or comprising Ag, Ba, Be, Ca, Cd, Co, Cr, Cu, Fe, Ge, Ir, Mg, Mn, Mo, Ni, Pb, Pd, Pt, Re, Ru, Sb, Sc, Sn, Sr, V, and Zn. In specific embodiments, these solutions comprise one or more of antimony, arsenic, germanium, and/or tin at levels of less than 5 µg/L or 5 µg/mol of redox active electrolyte in the redox active electrolyte solution.

Further, flow batteries in which one or more of the disclosed electrolytes are also within the scope of this disclosure.

Additional embodiments of the present disclosure include those devices useful for effecting these methods and producing these purified electrolyte compositions. These devices include those comprising at least one electrochemical cell comprising a first and second half-cell chamber separated by a cation exchange membrane, wherein:
 (i) the first half-cell chamber comprises a first electrode, preferably a carbon electrode, in contact with a first aqueous electrolyte containing a redox active material and a reducible impurity; and
 (ii) the second half-cell chamber comprises a second electrode in contact with a second aqueous electrolyte, the second aqueous electrolyte comprising one or more salts comprising non-protic cations at a concentration of at least 0.1 M, the second electrode comprising a catalyst for the generation of $O_2$, preferably comprising nickel such as Ni foam, stainless steel mesh, stainless steel felt, Ni oxide, Ni hydroxide, Ni oxy-hydroxide, or Ni—Fe oxide.

Additional embodiments include those electrochemical cells comprising a first and second half-cell chamber separated by a cation exchange membrane, wherein:
 (i) the first half-cell chamber comprises a first electrode, preferably a carbon electrode such as carbon cloth, carbon felt, or carbon paper, in contact with a first aqueous electrolyte containing a redox active material and a reducible impurity; and
 (ii) the second half-cell chamber comprises a second electrode in contact with a second aqueous electrolyte having a pH of at least 2 and comprising one or more salts having non-protic cations at a concentration of at least 0.1 M,
 (iii) said second electrode comprising a catalyst for the generation of $O_2$, preferably at least one of platinum or an oxide of cobalt, iridium, iron, manganese, nickel, ruthenium, tin, or a combination thereof, most preferably $IrO_2$.

In still other embodiments, the electrochemical cells comprise a first and second half-cell chamber separated by a membrane, wherein
 (i) the first half-cell chamber comprises a first electrode in contact with a first aqueous electrolyte containing a redox active material and a reducible impurity; and
 (ii) the second half-cell chamber comprises a second electrode comprising a catalyst for the generation of $O_2$; and wherein the second half-cell chamber does not contain (is free of) an aqueous electrolyte.

Still further embodiments include methods of effecting the disclosed methods, including operating the disclosed electrochemical cells, such methods including operating the electrochemical devices described herein by passing sufficient electrical current through the cell under conditions sufficient to reduce the concentration of the reducible impurity in the first aqueous electrolyte to a pre-determined level, for example to the levels described elsewhere herein.

BRIEF DESCRIPTION OF THE DRAWINGS

The present application is further understood when read in conjunction with the appended drawings. For the purpose of illustration, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIGS. 3(A-C) illustrate several potential embodiments of the HERM device.

DETAILED DESCRIPTION OF ILLUSTRATIVE EMBODIMENTS

Figure 1:
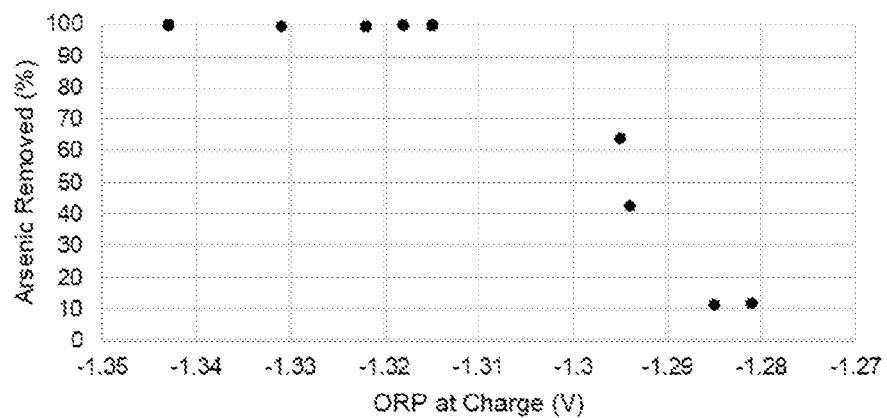
FIG. 1 is a dot plot of the percent of arsenic removed as a function of oxidation reduction potential (ORP) after negolyte charging. Beyond a certain solution potential, greater than 99% of the arsenic in solution has been removed after conditioning, as measured by ICP-OES. Each point in FIG. 2 represents a separate experiment in which a negative electrolyte was charged to the solution potential (vs. Ag/AgCl) indicated on the x-axis, at a temperature of 45° C. Charged electrolytes were conditioned at 65° C. for several hours while being sparged with flowing nitrogen and were subsequently discharged by heating to reflux under the same gas flow conditions. ICP-OES was used to analyze the arsenic content in the electrolytes.
Figure 2:
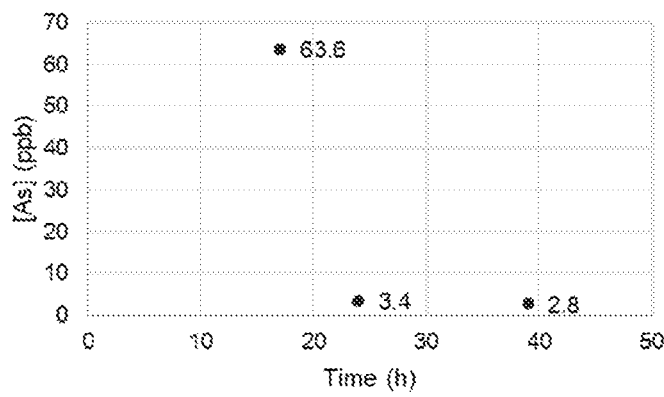
FIG. 2 is a dot plot of the concentration of arsenic in charged negolyte at 65° C. over a time period of about 40 hours.

The present disclosure relates to electrolyte solutions (posolyte or negolyte or both) and methods for preparing the same. In particular, the present disclosure relates to the preparation of electrolyte solutions containing a level of impurity that is below a pre-determined threshold level.

The present disclosure may be understood more readily by reference to the following description taken in connection with the accompanying Figures and Examples, all of which form a part of this disclosure. It is to be understood that this disclosure is not limited to the specific products, methods, conditions or parameters described and/or shown herein, and that the terminology used herein is for the purpose of describing particular embodiments by way of example only and is not intended to be limiting of any claimed subject matter. Similarly, unless specifically otherwise stated, any description as to a possible mechanism or mode of action or reason for improvement is meant to be illustrative only, and this disclosure is not to be constrained by the correctness or incorrectness of any such suggested mechanism or mode of action or reason for improvement. Throughout this text, it is recognized that the descriptions and embodiments refer to methods of preparing impurity-reduced electrolyte solutions, including redox active electrolyte solutions, the impurity-reduced electrolyte solutions themselves, and the electrochemical devices and methods of using these electrochemical devices useful for effecting the methods. Embodiments or descriptions used to describe or characterize any one of these categories should be read as referring to all of these categories. That is, where the disclosure describes and/or claims a feature or embodiment associated with a system or device or a method of making or using a system or device, it is appreciated that such a description and/or claim is intended to extend these features or embodiment to embodiments in each of these contexts (i.e., system, devices, methods, and compositions).

It is to be appreciated that certain features of the invention which are, for clarity, described herein in the context of separate embodiments, may also be provided in combination or in a single embodiment. That is, unless obviously incompatible or specifically excluded, each individual embodiment is deemed to be combinable with any other embodiment(s) and such a combination is considered to be another embodiment. Conversely, various features disclosed that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments "A," "B," "C," "A or B," "A or C," "B or C," and "A, B, or C."

The present disclosure is directed to, inter alia, electrochemical methods and devices for reducing unwanted impurities from redox active electrolytes, in some cases capable of reducing some impurities to low mg/L or mg/mol or even μg/L or μg/mol levels. The disclosure is also directed to electrolyte compositions having such reduced impurity levels and redox batteries incorporating such electrolytes.

Description of General Methods

Accordingly, certain embodiments of the present disclosure provide methods for preparing an electrolyte solution having reduced impurity levels, such methods comprising at least electrochemically reducing an impurity, the impurity being present at an initial concentration, contained within an initial electrolyte solution also comprising a redox active electrolyte, under conditions sufficient to generate an electrochemically treated electrolyte solution containing a reduced form of the redox active electrolyte and a reduced form of the impurity. In related embodiments, the methods may further comprise separating the reduced form of the impurity from the electrochemically treated solution, so as to provide a final electrolyte solution having a final concentration of the impurity that is less than the initial concentration of the impurity.

These methods comprise electrochemically reducing the impurity to generate a reduced form of the impurity. In some embodiments, the electrochemical reduction is performed in an electrochemical cell using skill in the art. The impurity may be soluble in the electrolyte or may be present as a solid in the redox active electrolyte. One skilled in the art would readily be able to affect the electrochemical reduction using skill in the art and the teachings herein. Generally, the electrochemical reduction is performed by passing an electric current through the electrolyte solution. Desirably, the reduction is performed at an oxidation/reduction potential that is more negative than the reduction potential of the impurity. The oxidation/reduction potential required is selected based on the impurity to be removed from the electrolyte.

Discussions as to the intended meanings of the terms "electrolyte," "redox active electrolyte," "impurity," and "reduced form of the impurity" are provided elsewhere herein. Further, the methods are applicable whether the initial electrolyte solution comprising the impurity and the redox active electrolyte has a pH rendering it alkaline, neutral, or acidic, these features reflecting the nature of the specific redox active electrolyte being used.

Clearly the nature and initial concentrations of the impurities depend on the nature and concentrations of the redox active electrolytes and other materials used in the formulation of the initial electrolyte solution. For example, vanadium-containing electrolytes are known to contain metal elements such as Sb, As, Cr, Mn, Fe, Co, Ni, Cu, Zn, Mo, or Sn. These same types of impurities may exist in other metal-containing redox active electrolytes. In other embodiments, the impurity comprises one or more forms of antimony, arsenic, germanium, mercury, tin, or a combination thereof.

In certain of these embodiments, the concentration of the redox active electrolyte, especially those containing metals or metalloids, is at least 0.5 M. Other embodied concentrations are described elsewhere herein, in the context of the final redox active electrolyte solution.

The methods as described herein allow that the final concentration of the impurity in the final electrolyte solution can be tuned to a pre-determined threshold level. For example, in some embodiments, the final concentration of the impurity in the final electrolyte solution can be any of the impurity levels described herein, though in preferred embodiments, these impurity levels are defined in terms of:

(i) less than about 50 μg of the impurity per liter of the final electrolyte solution, preferably less than 10 μg/L, more preferably less than 5 μg/L, still more preferably less than 1 μg/L; or (ii) less than about 50 μg of the impurity mole of the redox active electrolyte in the final electrolyte solution ("μg/mol"), preferably less than 10 μg/mol, more preferably less than 5 μg/mol, still more preferably less than 1 μg/mol. Using the conditions described herein, these levels have been achieved for various impurities. In specific independent embodiments, for example, the methods provide and final electrolytes solutions contain germanium at levels less than 10 μg/L or 10 μg/mol and/or tin at levels less than 10 μg/L or 10 μg/mol, and/or arsenic at levels less than 5 μg/L or 5 μg/mol, and/or antimony at levels of less than 5 μg/L or 5 μg/mol, and/or mercury at levels of 5 μg/L or 5 μg/mol or less. Of course, the methods may provide and the final electrolytes solutions may also contain one or more of these impurities at higher levels, as described elsewhere herein.

The methods may also be characterized by their efficiencies in removing the impurities, and reducing their initial levels to the final, pre-determined levels. In some embodiments, then, the final impurity levels represent a 50% reduction of the impurities, relative to their initial levels. In other independent embodiments, the methods provide final redox active electrolyte solutions in which the final impurity concentration is at least 75%, 80%, 85%, 90%, 95%, 98%, 99%, or 99.9% lower than the concentration in the initial solution.

In some embodiments, the impurities are removed, or their concentrations reduced, when the reduced form of the impurity is separated by plating on or within the cathode of the electrochemical cell. In other embodiments, the processing results in the reduced form of the impurity precipitating from the electrochemically treated electrolyte solution. Once precipitated, the reduced form of the impurity may be removed by filtration, decanting, or known methods for removing solids from solutions. In some embodiments, the precipitated reduced form of the impurity is removed by coagulating sedimentation, filtration, or membrane separation. In further embodiments, the precipitated reduced form of the impurity is removed by filtration. The filtration may be performed by passing the electrolyte containing the reduced form of the impurity through, for example, a filter of chelate resin or a column packed with beads of chelate resin.

In other embodiments, the nature of the impurity is such that the reduced form of the impurity is a volatile hydride. In particular, this class of impurities includes, for example, antimony, arsenic, germanium, or tin; i.e., where the volatile hydride is arsine ($AsH_3$), germane ($GeH_4$), stannane ($SnH_4$), or stibine ($SbH_3$).

Clearly for the electrochemical reduction to be effective, it is performed at an oxidation reduction potential that is more negative than the reduction potential of the impurity in the presence of the redox active electrolyte. As different impurities have different reduction potentials, the skilled artisan should select the appropriate reduction potential for the target impurity. For present purposes, it is immaterial whether the impurity is directly reduced under the conditions applied, or indirectly from the reduced form of the redox active material (or vice versa), as long as the impurity is reduced. While it may happen that the presence of a given redox active electrolyte may affect the reduction potential of the impurity, to a first approximation the reduction potential of the impurities can be determined, or are known, independent of the presence of the redox active electrolyte, and for this reason, determining the exact reduction potential would be within the capabilities of a person of skill in the art. Also, the effects of pH on standard reduction potential are known and again the person of skill in the art would be able to accurately predict the appropriate potential to apply to effect the desired transformation.

Where the processing results in the formation of a volatile reduced impurity, such as a volatile hydride, further steps may be helpful in removing that volatile material, especially when generated in large vessels. Such "conditioning" steps may comprise heating the electrochemically treated electrolyte solution under inert atmosphere conditions at a temperature above ambient temperature, up to the boiling point of the electrochemically treated or final electrolyte solutions. For most commercially relevant systems, the boiling point of the final aqueous electrolyte solution is on the order of 105° C. to 110° C. In some embodiments, then, such heating can be applied to a temperature in a range of or including one or more of from 20° C. to 25° C., from 25° C. to 30° C., from 30° C. to 35° C., from 35° C. to 40° C., from 40° C. to 45° C., from 45° C. to 50° C., from 50° C. to 55° C., from 55° C. to 60° C., from 60° C. to 65° C., from 65° C. to 70° C., from 70° C. to 75° C., from 75° C. to 80° C., from 80° C. to 85° C., from 85° C. to 90° C., from 90° C. to 95° C., from 95° C. to 100° C., from 100° C. to 105° C., or from 105° C. to 110° C., for example from 35° C. to 95° C., or more preferably from 45° C. to 85° C. It is further appreciated that, for aqueous systems, increasing the temperature of an electrolyte can foster the oxidation of a charged redox active electrolyte or the reduced impurity, resulting in hydrogen evolution. To avoid this, the temperature should be selected such that such oxidation is avoided (e.g., so that the electrolyte remains charged and/or the oxidation of the escaping hydride back to a soluble, non-volatile state is prevented). Alternatively, or additionally, the operator may maintain the electrolyte solution at an appropriate electric potential (i.e., that is more negative than the reduction potential of the impurity and/or the redox active electrolyte) during the course of the heating.

In addition to heating, or as an alternative to heating, such "conditioning" steps may comprise purging or sparging the electrochemically treated electrolyte solution or the heated solution using an inert gas, such as nitrogen or argon. Again, it is important to maintain the reduced impurity in its volatile form. The purging may also be performed using mixing at a speed sufficient to remove the reduced form of the impurity. The inventors found that purging, optionally with mixing, facilitates efficient transfer of the dissolved reduced form of the impurity into the gas phase and removal from the electrolyte.

Where applied, the heating and/or sparging may be performed simultaneously or sequentially, through one or more cycles.

Once at least a portion of the reduced form of the impurity has been removed, and the level of impurity in the final electrolyte solution is at its appropriate level, the redox active material may possibly be in its fully reduced/charged state. Whether for safety or any other reason (for example, to minimize unintentional oxidation accompanied by hydrogen evolution during transport of the final electrolyte solution), it may be desirable to lower the state of charge of the final electrolyte solution (i.e., to at least partially discharge the redox active electrolyte). This may be accomplished by any appropriate oxidation method. For example, this may be done chemically, by purging with an oxidizing gas, such as air or oxygen, or through use of a chemical oxidizing agent, such as hydrogen peroxide, or electrochemically, by using a hydrogen evolution catalyst (e.g., activated carbon, carbon cloth, carbon felt, carbon paper, Ti mesh, Ti felt, expanded Ti mesh, Pt-plated Ti mesh, or a combination thereof), or by some combination of these methods. The reagents or methods for such oxidations are preferably chosen such that no deleterious materials are introduced.

The oxidations may be conducted at ambient or reduced or elevated temperatures. In certain embodiments, the final electrolyte solutions are oxidized at one of more temperatures of at least 65° C. or greater, preferably at a temperature of about 85° C. or greater, more preferably at a temperature of about 105° C. or greater, again to the boiling point of the final electrolyte solution. In certain circumstances, the application of heat and/or sparging may also be helpful, and in fact may intentionally be used to further concentrate the redox active electrolyte in the final redox active solution.

Electrochemical Devices (HERM Devices)

To this point, this disclosure has focused on the methods for removing these reducible impurities and the impurity-reduced electrolytes, but the disclosure also encompasses the devices/systems useful for effecting these methods.

To be operative, the chemistries require devices/systems that "inject" electrons into the electrolyte solution, the electrolyte solution containing the redox active material, at a potential sufficient to reduce the reducible impurity. Not previously discussed is the effect or nature of the counterbalancing cation that must necessarily accompany the injected electrons. However, the specific choice of device/system (hereafter referred to as "HERM device" or Hybrid Electrochemical Removal Modular device) used depends on the electrolyte being "cleaned" (i.e., the solution containing the redox active material from which the impurity is being cleaned). The choice of system also needs to consider the state of charge of the redox active material and that the amounts of impurities (even if taken as 100) mg/L or 100 ppm) relative to the redox active material in any practical electrolyte solution (typically greater than 0.5 M) being cleaned will be very small. Consider, for example, a hypothetical one liter solution of an electrolyte solution containing 1 M redox active material at 50% state of charge containing 100 ppm of a reducible impurity. Nearly all the electrons pumped into such a system will be used to reduce the redox active material and only a small proportion will be used to reduce the reducible impurity. The electrons required to reduce the state of charge of the redox active material may be several orders of magnitude greater than that necessary to reduce the reducible material. And in any such system, these electrons will be accompanied by an equal amount of counterbalancing cations.

Perhaps more importantly, whether the electrolyte being treated is acidic or alkaline, an injection of hydrogen ions at these levels will generally result in a concentration that is much higher than the hydrogen ion content of the electrolyte being treated (even at a pH=2, the $[H^+]$=0.01 M). Such an injection will have a significant impact on changing the pH of the treated electrolyte. This can be resolved by pH adjusting the electrolyte solution with an appropriate base after the reduction step is completed, but even the addition of bases can introduce significant impurities to the purified electrolyte solutions. A more elegant solution is to use a HERM device that simultaneously injects alkali metal or alkaline earth metal (or other non-protic) cations with the electrons.

Devices previously described for pH balancing a system include those described in WO 2015/048074 (the '074 Application), the contents of which are incorporated by reference herein for all purposes, but at least for its teaching of the hardware and methods of use describe therein. The '074 application teaches equipment and methods for simultaneously balancing both the electron and proton contents of working electrolytes. As described therein, the device described as a rebalancing cell or balancing cell describes devices and methods for injecting both electrons and protons into a redox active electrolyte solution. While principally described in terms of affixed to a working flow battery, the description also describes the rebalancing cell as a stand-alone device. Several embodiments discussed in the '074 application, and which are set forth herein, include those where the balancing cell comprises:

(1) a first and second half-cell chamber, wherein the first half-cell chamber comprises a first electrode in contact with a first aqueous electrolyte of the redox flow battery; and wherein the second half-cell chamber comprises a second electrode in contact with a second aqueous electrolyte, said second electrode comprising a catalyst for the generation of $O_2$. In some of these embodiments, the pH of the second aqueous electrolyte is at least 2 preferably greater than about 7, more preferably in a range of about 9 to about 14. In other embodiments, there is no added second electrolyte.

(2) a first half-cell chamber with a first electrode in contact with a first aqueous electrolyte of the redox flow battery; the second half-cell chamber comprises a second electrode in contact with a second aqueous electrolyte, said second electrode comprising a sacrificial carbon electrode material for the generation of $O_2$ and/or $CO_2$. The two half-cell chambers are separated by an ion exchange ionomer membrane.

(3) a first half-cell chamber with a first electrode in contact with a first aqueous electrolyte of the redox flow battery; the second half-cell chamber comprises a second electrode comprising a catalyst for the generation of $O_2$ but said electrode is not in contact with a second aqueous electrolyte. The two half-cell chambers are separated by an ion exchange ionomer membrane.

In these embodiments, the first aqueous electrolyte is described as comprising a negative working electrolyte ("negolyte") of the redox flow battery. In various embodiments, the electrochemistry associated with the second half-cell of the balancing cell at acidic or neutral pH values is described in terms of Equation (1):

$$2H_2O \rightarrow 2O_2 + 4H^+ + 4e^- \tag{1}$$

and at more basic pH values, the electrochemistry associated with the second half-cell of the balancing cell is described in terms of Equation (2):

$$4OH^- \rightarrow 2H_2O + O_2 + 4e- \tag{2}$$

The corresponding electrochemical reactions associated with the first half-cell may be described in Equation (3):

$$M^n + e^- \rightarrow M^{n-1} \tag{3}$$

and $$IMP^{n+} + n\ e^- \rightarrow IMP^0 \tag{4}$$

or $$IMP^{n+} + n\ e^- + n\ H^+ \rightarrow IMP \cdot H_n \tag{5}$$

where $M^n$ and $M^{n-1}$ represent the oxidized and reduced forms of redox active species in the negolyte, respectively, corresponding in the present application to the redox active material in the solution to be treated, where "$IMP^{n+}$" refers to an initial form of an impurity (e.g., $As^{3+}$) and $IMP^0$ and $IMP \cdot H_n$ refer to the reduced metallic or hydride forms of the impurity, respectively. In the present context, two such reaction schemes may be seen in equations (6) and (7):

$$As + 3H^+ + 3e^- \rightarrow AsH_3 \tag{6}$$

$$As + 3H_2O + 3e^- \rightarrow AsH_3 + 3OH^- \tag{7}$$

Because the '074 Application is directed to simultaneous balancing of the electron and proton contents of the working electrolyte solutions, in both situations, the transport of protons through the membrane from the second to first half-cell of the pH correction cell is said to provide the charge balance to the negolyte. As one of the consequences of this design, the '074 Application describes that when the second half-cell chamber comprises a second electrode comprising a catalyst for the generation of $O_2$ operated in an alkaline environment, the two half-cell chambers are separated by a bipolar membrane consisting of one cation exchange and one anion exchange ionomer membrane sandwiching a metal oxide film that facilitates water dissociation. It is through the use of a bipolar membrane that the balancing cell is described as operating while deploying an alkaline electrolyte in the second half-chamber.

However, in the present case, for reasons described above, it is less desirable to simultaneously pump electrons and protons (as described in the '074 Application), and more desirable to simultaneously pump electrons and other non-protic cations into an electrolyte solution. As such, the devices described in the '074 Application can be reconfigured to simultaneously pump electrons and non-protic cations by incorporating alkali or alkaline earth metal cations (or even ammonium cations) in the second electrolyte at a concentration sufficient to prevent the need for pH adjustment of the first aqueous electrolyte after electrochemical treatment. In preferred embodiments, the alkali or alkaline earth metal cations (or even ammonium cations) in the second electrolyte are present at a concentration that is much greater (e.g., greater than 10, 100, 500, 1000, 5000, or 10,000 times higher than the concentration of protons in the second electrolyte). In certain embodiments, these non-protic cations may be alkali or alkaline earth metal cations, for example $Li^+$, $Na^+$, $K^+$, $[NH_nR_{4-n}]^+$ (R=alkyl), or mixtures thereof. These non-protic cations may be present in the second aqueous electrolyte in a concentration range of at least 0.1 M to their saturation concentrations, or in a range of from 0.1 M to 0.2 M, from 0.2 M to 0.3 M, from 0.3 M to 0.4 M, from 0.4 to 0.5 M, from 0.5 M to 0.6 M, from 0.6 M to 0.7 M, from 0.7 M to 0.8 M, from 0.8 to 0.9 M, from 0.9 M to 1 M, from 1 M to 1.25 M, from 1.25 M to 1.5 M, from 1.5 M to 2 M, or higher, or any combination thereof. Exemplary counterions to these cations include hydroxides, phosphates, or sulfates.

In the present case, a similar system as that described in the '074 Application (including the aspect of its hardware) may be used as a HERM device, either attached to a flow battery as described in the '074 Application, or as attached to a storage tank or vessel, and/or divorced from a working system. Since the HERM device is not used in conjunction with a working flow battery system, voltage and other efficiencies of the HERM device are not critical to the economics of such a flow battery system.

In certain embodiments of the present disclosure, the electrochemical cell comprises a first and second half-cell chamber separated by a membrane, wherein:
the first half-cell chamber comprises a first electrode, preferably a carbon electrode such as carbon cloth, carbon felt, or carbon paper, in contact with a first aqueous electrolyte containing a redox active electrolyte (e.g., a negolyte) and a reducible impurity; and
the second half-cell chamber comprises a second electrode in contact with a second aqueous solution, preferably acidic, but having a pH of at least 2, said second electrode comprising a catalyst for the generation of $O_2$, preferably at least one of platinum or an oxide of cobalt, iridium, iron, manganese, nickel, ruthenium, tin, or a combination thereof, most preferably $IrO_2$.

In other embodiments, then, the present disclosure contemplates an electrochemical cell comprising a first and second half-cell chamber separated by a membrane, wherein:
the first half-cell chamber comprises a first electrode, preferably a carbon electrode, in contact with a first aqueous electrolyte containing a redox active material and a reducible impurity; and
the second half-cell chamber comprises a second electrode in contact with a second aqueous solution, said second electrode comprising a catalyst for the generation of $O_2$, preferably comprising nickel such as Ni foam, stainless steel mesh, stainless steel felt, Ni oxide, Ni hydroxide, Ni oxy-hydroxide, or Ni—Fe oxide.

In certain of these embodiments, the membrane is a cation exchange membrane ("CEM"). In these embodiments, the membrane is not a bipolar membrane as described in the '074 Application and does not contain an incorporated anion exchange membrane. Materials useful for these cation exchange membranes include perfluoro- or polyfluorosulfonic acid membranes (NAFION™, AQUIVION™, or FLEMION™ membranes) including copolymers of tetrafluoroethylene, optionally comprising perfluoropolyvinyl ethers, sulfonated hydrocarbon membranes (sulfonated polyether ether ketone, sulfonated polyphenyl sulfone). Other exemplary perfluorinated membrane materials include copolymers of tetrafluoroethylene and one or more fluorinated, acid-functional co-monomers. Other useful perfluorinated electrolytes comprise copolymers of tetrafluoroethylene (TFE) and $FSO_2$—$CF_2CF_2CF_2CF_2$—O—CF=$CF_2$.

In some embodiments, the second aqueous electrolyte is free of redox active materials. In still other embodiments, the second aqueous electrolytes contain non-protic cations at levels discussed elsewhere herein for this purpose. Preferably the type and proportion of the non-protic cations of the second solution approximately or actually match that of the electrolyte solution being treated (in the first half-cell). The term "approximately match" refers to a distribution that does not require that the cation content in the redox-containing electrolyte needs adjustment after treatment. The mobility of the respective cations through the membrane may require that the relative proportions of the cations in the second electrolyte solution differ slightly from the corresponding proportions in the electrolyte being treated. The ability to determine these differences, if at all necessary, may be identified without undue experimentation by the skilled artisan.

In still other independent embodiments, the pH of the first and second aqueous electrolytes are both less than seven, are both about seven, or are both greater than seven. Such devices and methods may be used to treat highly acidic redox active electrolytes, such as exist, for example, in vanadium or iron-chrome flow batteries, and alkaline or PH neutral redox active electrolytes, for example based on metal-ligand coordination compounds, such as titanium-based negolyte materials (and also including the broader range of negolytes described herein).

Preferably, the pH of the first and second aqueous electrolytes differ by less than 5 pH units. In other independent embodiments, the electrolytes differ by less than 4, 3, 2, or 1 pH units. If higher, strategies using pH buffering layers, such as described in PCT/US2018/054798, filed Oct. 8, 2018 may also be employed.

As described above, the second electrode generally comprises a catalyst for the generation of $O_2$. In certain of these embodiments, the second electrode comprises a metal oxide catalyst, said metal oxide catalyst being suitable for the electrochemical generation of $O_2$ from water. In addition to the ability to generate $O_2$, these oxidation catalysts preferably resist corrosion under the pHs considered in this application, are poor catalysts for the reduction of water to hydrogen, or both. Catalysts which corrode under the acidic or basic oxidizing conditions of the operating second aqueous electrolyte have the potential to cross-over to the first pH correction half-cell, interfering with either the intended effect of the pH correction cell or, worse, with the operation of the flow battery. If such cross-over catalysts are further efficient catalysts for the generation of hydrogen under the reducing conditions of the first half-cell, one can envision scenarios where the evolution of hydrogen in the first half-cell or at the negative electrode of the working flow battery causes safety concerns. Accordingly, the present invention contemplates the preferred use of oxides of cobalt, iridium, iron, manganese, nickel, ruthenium, tin, or a combination thereof for use in the second electrode. Iridium oxide is especially preferred, because of its good catalytic activity toward $O_2$ evolution and its high corrosion resistance.

In case the second half-chamber comprises an alkaline electrolyte, catalysts such as nickel or nickel-iron oxide are especially preferred because of their good catalytic activity toward $O_2$ evolution and their high corrosion resistance in base. Suitable materials here include Ni foam, stainless steel mesh, stainless steel felt, Ni oxide, Ni hydroxide, Ni oxyhydroxide, or Ni—Fe oxide.

In some embodiments, the second electrode of the HERM device comprises carbon. Such electrodes are well known in the art and include graphitic carbon, glassy carbon, amorphous carbon, carbon doped with boron or nitrogen, diamond-like carbon, carbon onion, carbon nanotubes, carbon cloth, carbon felt, carbon paper, and graphene. Carbon materials are capable of evolving $O_2$, albeit at rather high overpotentials, but it is inevitable that the carbon electrode itself will be oxidized into $CO_2$. As such, the carbon electrodes are semi-sacrificial of nature. In other embodiments, the second electrode may also comprise Ti mesh, Ti felt, expanded Ti mesh, stainless steel mesh, and stainless steel felt.

In still other embodiments, the electrochemical cells comprise a first and second half-cell chamber separated by a membrane, wherein
(i) the first half-cell chamber comprises a first electrode in contact with a first aqueous electrolyte containing a redox active material and a reducible impurity; and
(ii) the second half-cell chamber comprises a second electrode comprising a catalyst for the generation of $O_2$; and wherein the second half-cell chamber does not contain (is free of) an aqueous electrolyte.

In this configuration, the water required for the $O_2$ evolution reaction is provided by water from the aqueous electrolyte in the first half-chamber that is transported across the membrane. To avoid the situation of mass transport limitations, the water transport across the membrane needs to be faster than the consumption of water at the metal oxide catalyst. The membrane on the side of the second half-chamber is coated with a metal oxide $O_2$ evolution catalyst (e.g. $IrO_x$) as a result of which water that is transported from the first half-chamber across the membrane is directly oxidized into molecular oxygen and protons. This configuration may greatly simplify the design of the electrochemical device. For instance, the metal oxide catalyst on the membrane can be directly interfaced with the titanium endplate, omitting the need for the titanium meshes that act as a flow field for the second aqueous electrolyte. The only additional design feature would be a vent for the molecular oxygen that is evolved at the metal oxide catalyst. Furthermore, water would have to be added periodically to the negolyte electrolyte tank to compensate for water that is consumed in the $O_2$ evolution reaction. Optionally, this make-up water can be produced in-situ by combining the evolved $O_2$ from the second half-chamber with the $H_2$ evolved in the second half chamber of the electrochemical cell of the HERM device and in the negolyte compartment of the first cell. This water production process may be catalyzed by a noble metal catalyst (e.g. Pt, Pd, etc.).

Additional embodiments provide methods of operating any of these HERM devices described herein, each method comprising applying an electric potential across said first and second electrodes of the devices and supplying current to the device in the presence of the aqueous electrolyte being treated. The specific conditions for such operation are described elsewhere herein. When operating to remove impurities from electrolyte solutions containing these redox active materials, parasitic hydrogen evolution does not impede its primary function. This allows the use of less expensive materials, such as stainless steel in the construction of the electrodes.

Further embodiments include incorporating the batteries, electrochemical cells, fuel cells and/or flow batteries described herein into larger systems, for example, including cell stacks, storage tanks and pipings for containing and transporting the electrolytes, control hardware and software (which may include safety systems), and at least one power conditioning unit as part of an energy storage system. In such systems, the storage tanks contain the electroactive materials. The control software, hardware, and optional safety systems include all sensors, mitigation equipment and electronic/hardware controls and safeguards to ensure safe, autonomous, and efficient operation of the flow battery or other energy storage system.

Such storage systems may also include a power conditioning unit at the front end of the energy storage system to convert incoming and outgoing power to a voltage and current that is optimal for the energy storage system or the application. For the example of an energy storage system connected to an electrical grid, in a charging cycle the power conditioning unit would convert incoming AC electricity into DC electricity at an appropriate voltage and current for the electrochemical stack. In a discharging cycle, the stack produces DC electrical power and the power conditioning unit converts to AC electrical power at the appropriate voltage and frequency for grid applications. Such energy storage systems are well suited to sustained charge or discharge cycles of several hour durations. As such, the systems are suited to smooth energy supply/demand profiles and provide a mechanism for stabilizing intermittent power generation assets (e.g. from renewable energy sources). It should be appreciated, then, that various embodiments of the present invention include those electrical energy storage applications where such long charge or discharge durations are valuable. For example, non-limiting examples of such applications include those where systems of the present invention are connected to an electrical grid include renewables integration, peak load shifting, grid firming, baseload power generation/consumption, energy arbitrage, transmission and distribution asset deferral, weak grid support, and/or frequency regulation. Additionally, the devices or systems can be used to provide stable power for applications that are not connected to a grid, or a micro-grid, for example as power sources for remote camps, forward operating bases, off-grid telecommunications, or remote sensors.

Impurity-Reduced Redox Active Electrolyte Solutions

The present disclosure further embodies the final electrolyte solutions as available for the disclosed methods. These embodiments include those electrolyte solutions containing redox active electrolytes and impurities and impurity levels as disclosed herein, whether these electrolyte solutions were prepared ("derived from") the methods disclosed herein or not. As used herein, the term "derivable from" reflects the fact that a given electrolyte solution could have been prepared by the instant methods (i.e., contains the characteristics of the electrolyte solutions described herein), but was actually prepared by alternative methods.

These final, "impurity-reduced" electrolyte solutions contain at least one redox active electrolyte, one or more impurities at levels as described herein, and may optionally contain further additives (surfactants, viscosity modifiers, buffers, and non-redox active molecules/species electrolytes) as appropriate to the desired performance of the material.

The choice of the at least one redox active material is flexible, and includes for example salts of vanadium, iron, chromium, or various metal ligand coordination compounds. These latter types of materials are described elsewhere herein. In particular, the present disclosure highlights the utility of the present methods and the resulting redox active electrolyte solutions, where the redox active material comprises metal ligand coordination compounds comprising titanium, especially as negolytes.

In the experience of the inventors with bulk commodity chemicals, it is typical to find significant impurities in raw materials which then correspond to impurities in the final bulk formulated electrolyte. Caustics are a common source of impurities. Some typical impurity ranges from common precursor materials are given in Tables 1A and 1B below. These impurities can, depending on the processes employed, accumulate and be found in elevated concentrations in a final flow battery electrolyte. See also Table 2 for comparable data for titanium-catecholate derivatives prepared from commercial sources.

For example, should multiple equivalents of an economical grade of NaOH be used in the synthesis of an organic redox active material, the resulting material can be enriched in an impurity such as Ni. An electrolyte formulated from such a material may tend toward precipitation or elevated parasitic hydrogen evolution in a flow battery.

TABLE 1A

Typical impurity levels for common sources of raw materials used in the preparation of redox active electrolyte solutions

| Impurity, mg/kg | KOH | NaOH | $H_3PO_4$ | $TiCl_4$ |
|---|---|---|---|---|
| Nickel | 1-10 | 0.1-10 | | |
| Iron | 1-5 | 0.1-10 | 5-50 | 1-5 |
| Copper | 5 | 5 | | |
| Arsenic | 1 | 0.5-1 | 1-40 | 5-10 |
| Zinc | 10 | | | |
| Cobalt | | | | 2-5 |
| Chromium | | | | 2-5 |

TABLE 1B

Typical impurity levels for common sources of raw materials used in the preparation of redox active electrolyte solutions on a μg impurity per mole raw material basis (using data from Table 1A)

| Impurity, μg/mol | KOH | NaOH | $H_3PO_4$ | $TiCl_4$ |
|---|---|---|---|---|
| Nickel | 56-560 | 4-400 | | |
| Iron | 56-280 | 4-400 | 490-4900 | 190-950 |
| Copper | 280 | 200 | | |
| Arsenic | 56 | 20-40 | 98-3920 | 950-1900 |
| Zinc | 560 | | | |
| Cobalt | | | | 380-950 |
| Chromium | | | | 380-950 |

TABLE 2

Impurity levels in some batches of Ti-catecholate electrolytes

| Impurity | Level (mg/L or ppm) | Impurity (μg/mol) |
|---|---|---|
| Calcium | 9.8 | 8200 |
| Iron | 7.7 | 6400 |

TABLE 2-continued

Impurity levels in some batches of Ti-catecholate electrolytes

| Impurity | Level (mg/L or ppm) | Impurity (µg/mol) |
|---|---|---|
| Magnesium | 3.4 | 2800 |
| Tin | 7.4 | 6200 |
| Zinc | 6.8 | 5700 |

Impurities from vanadium sources can be even higher:

TABLE 3

Illustrative levels for selected impurities in vanadium systems, as reported in Table 2 of U.S. Patent Application Publ. No. 2004/0241552. Calculated µg/mol values assume vanadium present as $V_2O_5$ and referenced back to V (using 59 g/mol as basis)

| | Reported | Calc'd ppm | Calc'd µg/mol V |
|---|---|---|---|
| Iron | 0.2% | 2000 ppm* (8.4-11.1) | 118,000 (495-655) |
| Titanium | 0.02% | 200 ppm | 11,800 |
| Uranium | 20 ppm | 20 ppm | 1800 |
| Arsenic | 40 ppm | 40 ppm* (59.9-62.4) | 2360 (3540-3680) |
| Nickel | 0.005% | 50 ppm | 2950 |
| Copper | 0.005% | 50 ppm | 2950 |
| Manganese | 0.005% | 50 ppm | 2950 |
| Chromium | 0.01% | 100 ppm | 5900 |
| Lead | 0.01% | 100 ppm | 5900 |

Note
that Table 4 of U.S. Patent Application Publ. No. 2004/0241552 showed as levels at 59.9 to 62.4 mg/L (ppm) and iron at 8.4 to 11.1 mg/L for "purified" solutions.

In these redox active electrolyte solutions, including impurity-reduced redox active electrolyte solutions, the concentration of the at least one redox active material is at least 0.7 M. In various embodiments, the concentration of the at least one redox active material is defined by one or more ranges of from 0.7 M to 0.8 M, from 0.8 to 0.9 M, from 0.9 M to 1 M, from 1 to 1.2 M, from 1.2 M to 1.4 M, from 1.4 to 1.6 M, from 1.6 M to 1.8 M, from 1.8 M to 2 M, from 2 to 2.2 M, from 2.2 M to 2.4 M, from 2.4 to 2.6 M, from 2.6 M to 2.8 M, from 2.8 M to 3 M, from 3 to 3.5 M, or from 3.5 M to 4 M. The levels of impurities in the final redox active solutions are relevant only in the context of these practically useful concentrations (or higher), and so should be interpreted in these contexts.

While the impurities are described generally as comprising one or more of Ag, As, Ba, Be, Ca, Cd, Co, Cr, Cu, Fe, Ge, Hg, Ir, Mg, Mn, Mo, Ni, Pb, Pd, Pt, Re, Ru, Sb, Sc, Se, Sn, Sr, Te, V, and Zn, in specific embodiments, the impurity is described as comprising one or more of As, Ge, Hg, and Sb.

Within these contexts, in some embodiments, the levels of these impurities may be defined on a mass basis with respect to the total mass of the redox active electrolyte solutions (independent of the amount of redox active electrolyte in the solution), typically on a ppm or ppb basis. Or they may be defined as a weight basis per unit volume of redox active electrolyte solution, for example, on a mg/L or u/L basis. Where the density of the redox active electrolyte solution is 1 g/L, the corresponding numerical values of ppm vs. mg/L and ppb vs. µg/L are equivalent.

Accordingly, in independent embodiments, the redox active electrolyte solution contains less than about 10 mg of one or more of a given impurity per liter of redox active electrolyte solution ("mg/L"), less than 5 mg/L of one or more of a given impurity, less than 2.5 mg/L of one or more of a given impurity, less than 1 mg/L of one or more of a given impurity, less than 500 µg of one or more of a given impurity per liter of redox active electrolyte solution ("µg/L"), less than 250 µg/L of one or more of a given impurity, less than 100 µg/L of a given impurity, less than 50 µg/L of one or more of a given impurity, less than about 40 µg/L of one or more of a given impurity, less than about 30 µg/L of one or more of a given impurity, less than about 20 µg/L of one or more of a given impurity, less than about 10 µg/L of one or more of a given impurity, less than about 5 µg/L of one or more of a given impurity, or less than about 1 µg/L of one or more of a given impurity. Again, for the sake of clarity, these descriptions are intended to apply to each material described as an impurity individually and independently of one another. For example, with these described limits, one embodied composition specifying As, Sb, and Ge may contain, for example, less than 5 µg/L As, less than 10 µg/L Sb, and less than 50 µg/L Ge.

In some embodiments, the electrolyte solution contains less than about 50 µg/L of one or more of As, Ge, Hg, and Sb. In other preferred embodiments, the electrolyte solution contains less than about 5 µg/L of one or more of Ag, As, Ba, Be, Ca, Cd, Co, Cr, Cu, Fe, Ge, Hg, Ir, Mg, Mn, Mo, Ni, Pb, Pd, Pt, Re, Ru, Sb, Sc, Sn, Sr, V, and Zn. In further preferred embodiments, the electrolyte solution contains less than about 5 µg/L of one or more of Sb, As, Ge, Sn, or a combination thereof. In other preferred embodiments, the electrolyte solution contains less than about 5 µg/L of As, Hg, or a combination thereof. In yet further preferred embodiments, the electrolyte solutions contain less than about 5 µg/L of Sb, As, or a combination thereof. In still other preferred embodiments, the electrolyte solution contains less than about 10 µg/L of Ge, Sn, or a combination thereof.

However, since the principle source of adventitious impurities is typically the metals used as redox active metal (e.g., vanadium) or a redox active metal ligand coordination compound (e.g., as in titanium catecholates), these impurity levels may also be (perhaps more appropriately) defined in terms of their mass basis with respect to the amount of the redox active electrolyte in the redox active electrolyte solution. In such cases, the relevant basis becomes parts by weight of the impurity per mole of redox active electrolyte in the redox active electrolyte solution (i.e., on a mg/mole or µg/mol basis). Again, when the concentration of the redox active electrolyte in the redox active electrolyte solution is 1 M, the values of mg/mole or µg/mol are numerically equivalent to ppm or ppb, respectively. But in fact, additional embodiments include those where the impurity levels described in terms of mg/L or µg/L per molar concentration of the redox active electrolyte in the redox active electrolyte solution (e.g., a definition of 10 µg impurity/L solution per 0.8 M redox active electrolyte solution would correspond to [10 µg/L]/[0.8 mol/L] or 12.5 µg impurity/mol of redox active electrolyte in the redox active electrolyte solution.

In independent embodiments, then, using a 1M basis, the redox active electrolyte solution contains less than about 10 mg of one or more of a given impurity per mole of the redox active electrolyte in the redox active electrolyte solution (designated hereinafter as "mg/mol", or less than 5 mg/mol, less than 2.5 mg/mol, less than 1 mg/mol, less than 500 µg/mol, less than 100 µg/mol, less than 50 µg/mol, less than 40 µg/mol, less than 30 µg/mol, less than 20 µg/mol, less than about 10 µg/mol, less than 5 µg/mol, or less than 1 µg of the one or more of a given impurity per mole of the redox active electrolyte in the redox active electrolyte solution.

Likewise, in some embodiments, the electrolyte solution contains less than about 50 µg/mol of one or more of As, Ge, Hg, and Sb. In other preferred embodiments, the electrolyte solution contains less than about 5 µg/mol per mole of one or more of Ag, As, Ba, Be, Ca, Cd, Co, Cr, Cu, Fe, Ge, Hg, Ir, Mg, Mn, Mo, Ni, Pb, Pd, Pt, Re, Ru, Sb, Sc, Sn, Sr, V, and Zn. In further preferred embodiments, the electrolyte solution contains less than about 5 µg/mol of one or more of Sb, As, Ge, Sn, or a combination thereof. In other preferred embodiments, the electrolyte solution contains less than about 5 µg/mol of As, Hg, or a combination thereof. In yet further preferred embodiments, the electrolyte solutions contain less than about 5 µg/mol of Sb, As, or a combination thereof. In still other preferred embodiments, the electrolyte solution contains less than about 10 µg/mol of Ge, Sn, or a combination thereof.

Use of the Impurity-Reduced Electrolyte Solutions Electrochemical (Redox) Systems The inventive redox active electrolyte solutions may also be used in flow battery or fuel cell applications. The disclosure therefore encompasses those flow batteries comprising at least one half-cell containing one of the impurity-depleted electrolyte solutions described herein and systems comprising these flow batteries.

Terms

Throughout this specification, words are to be afforded their normal meaning, as would be understood by those skilled in the relevant art. However, so as to avoid misunderstanding, the meanings of certain terms will be specifically defined or clarified.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

Unless otherwise specified, the term "aqueous" refers to a solvent system comprising at least about 98% by weight of water, relative to total weight of the solvent. In some applications, soluble, miscible, or partially miscible (emulsified with surfactants or otherwise) co-solvents may also be present which, for example, extend the range of water's liquidity (e.g., alcohols/glycols). When specified, additional independent embodiments include those where the "aqueous" solvent system comprises at least about 55 wt %, at least about 60 wt %, at least about 70 wt %, at least about 75 wt %, at least about 80%, at least about 85 wt %, at least about 90 wt %, at least about 95 wt %, or at least about 98 wt % water, relative to the total solvent. It some situations, the aqueous solvent may consist essentially of water, and be substantially free or entirely free of co-solvents or other species. The solvent system may be at least about 90 wt %, at least about 95 wt %, or at least about 98 wt % water, and, in some embodiments, be free of co-solvents or other species.

Unless otherwise specified, the term "non-aqueous" refers to a solvent system comprising less than about 10% by weight of water, generally comprising at least one organic solvent. Additional independent embodiments include those where the "non-aqueous" solvent system comprises less than about 50 wt %, less than about 40 wt %, less than about 30 wt %, less than about 20 wt %, less than about 10 wt %, less than about 5 wt %, or less than about 2 wt % water, relative to the total solvent.

As used herein, the terms "aqueous electrolyte," "electrolyte solution," and variations thereof (generally referred to as "electrolyte"), are intended to connote a solvent system comprising at least one material, whose conductivity is higher than the solvent system without the material.

The terms "electrochemically active electrolyte," or "redox active electrolytes," and variations thereof carry their normal connotations to those skilled in the art of electrochemistry. These terms typically are intended to connote those electrolyte compositions (compounds or solutions) capable of a redox transition; that is, capable of changing oxidation state or valence state upon the application of electric potential, by the capture or release of at least one electron. In the context of metal ligand coordination compounds, the metal may have multiple accessible valence states and be said to be redox active, or the ligand may be capable of accepting/releasing electrons and be said to be redox active, or a redox active material may contain one or both of redox active metals and ligands.

The electrolyte can contain various redox active materials. Examples of the electrolyte include vanadium-based electrolytes containing vanadium ions as an active material for both electrodes, iron-chromium-based electrolytes containing iron ions as a positive electrode active material and chromium ions as a negative electrode active material, manganese-titanium-based electrolytes containing manganese ions as a positive electrode active material and titanium ions as a negative electrode active material, manganese-titanium-based electrolytes containing manganese ions and titanium ions for both electrodes, among others.

In some embodiments, the electrochemically active electrolyte comprises a metal ligand coordination compound. In other embodiments, the electrochemically active electrolyte comprises a metal ligand coordination compound comprising a redox active metal ion and/or a redox inert metal ion. Preferably, the redox active metal ion or redox inert metal ion is Al, Ca, Co, Cr, Sr, Cu, Fe, Mg, Mn, Mo, Ni, Pd, Pt, Ru, Sn, Ti, V, Zn, or Zr, or a combination thereof. In other embodiments, the electrochemically active electrolyte comprises an organic active material. Preferably, the organic active material is carbon, an aromatic hydrocarbon, or a combination thereof. Example of aromatic compounds include, without limitation, a quinone, hydroquinone, viologen, pyridinium, pyridine, acridinium, or catechol. In some preferred embodiments, the electrolyte comprises a vanadium-based electrolyte.

As used herein, the term "redox couple" is a term of the art generally recognized by the skilled electrochemist and refers to the oxidized (electron acceptor) and the reduced (electron donor) forms of the species of a given redox reaction. The pair $Fe(CN)_6^{3-}/Fe(CN)_6^{4-}$ is but one, non-limiting, example of a redox couple. Similarly, the term "redox active metal ion" is intended to connote that the metal undergoes a change in oxidation state under the conditions of use. As used herein, the term "redox couple" may refer to pairs of organic or inorganic materials.

In addition to the redox active materials, the electrolyte may contain additional components such as solvents, buffering agents, supporting electrolytes, viscosity modifiers, wetting agents, and the like. The electrolytes may also contain metal elements, including heavy metals, as impurities, as defined herein. Examples of solvents include aqueous solutions comprising at least one of $H_2SO_4$, $K_2SO_4$, $Na_2SO_4$, $H_3PO_4$, $H_4P_2O_7$, $K_2HPO_4$, $NaSPO_4$, $K_3PO_4$, $HNO_3$, $KNO_3$, HCl, $NaNO_3$, NaOH, or KOH. Alternatively, the solvent may be an organic acid solvent.

As used herein, the term "impurity" connotes its recognized meaning as referring to an unwanted species, typically comprising a metal or metalloid, which is not intended to participate in the functioning of an electrochemical cell, as in a fuel cell or flow battery context, and in many cases, is deleterious to the safe and efficient use of the electrochemical cell. It is typically adventitiously present, introduced as an impurity (in the conventional sense of the word) with the intended materials. For example, as discussed elsewhere herein, in some systems, the presence of adventitious arsenic, antimony, and other such materials form precipitates during operation of flow batteries. While not considered the least bit helpful in the operation of the flow battery or fuel cell, their presence can adversely affect performance. The distinction that an impurity is defined in terms of being unwanted or ill-considered for a chosen redox active electrolyte is important, as metals or metalloids that can be considered or even chosen for use as redox active materials in some applications, may be considered impurities when present in other electrolytes. For example, in an electrolyte composition in which a metal ligand coordination compound comprising titanium is the chosen redox active electrolyte, the presence of vanadium in the same electrolyte solution is likely to be seen as an impurity, despite the fact that vanadium is chosen, in other systems, as the primary redox active electrolyte.

As used herein, the term "reduced form of the impurity" connotes a form of the impurity having a lower oxidation state than the impurity in the initial electrolyte solution. For example, where most metals or metalloids exist in solution as impurities as cationic species, or carrying a formal positive charge, as used herein, the metallic form of such an impurity (i.e., having a formal zero valence state) or a hydride form, such as arsine, stibine, germane, etc. have formal negative valence states, and so are considered to be reduced forms of the corresponding impurities. The reduced form of the impurity may include any reduced form of the impurity. In some embodiments, the reduced form of the impurity is volatile. In further embodiments, the reduced form of the impurity is a volatile hydride. Common reduced forms of the impurity include, without limitation, arsine ($AsH_3$), germane ($GeH_4$), stannane ($SnH_4$), stibine ($SbH_3$), or a combination thereof. In some embodiments, the reduced form of the impurity is $AsH_3$. In other embodiments, the reduced form of the impurity is $GeH_4$. In further embodiments, the reduced form of the impurity is $SnH_4$. In still other embodiments, the reduced form of the impurity is $SbH_3$. In further embodiments, the reduced form of the impurity is elemental mercury.

As used herein, the term "inorganic material" may include "metal ligand coordination compounds" or simply "coordination compounds" which are known to those skilled in the art of electrochemistry and inorganic chemistry. A (metal ligand) coordination compound may comprise a metal ion bonded to an atom or molecule. The bonded atom or molecule is referred to as a "ligand". In certain non-limiting embodiments, the ligand may comprise a molecule comprising C, H, N, and/or O atoms. In other words, the ligand may comprise an organic molecule. In some embodiments, the coordination compounds comprise at least one ligand that is not water, hydroxide, or a halide ($F^-$, $Cl^-$, $Br^-$, $I^-$), though the invention is not limited to these embodiments. Additional embodiments include those metal ligand coordination compounds described in U.S. Pat. No. 9,768,463, which is incorporated by reference herein in its entirety at least for its teaching of coordination compounds As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to the reversible hydrogen electrode.

In the present disclosure, the negative electrode associated with the first aqueous electrolyte of the balancing cell may comprise the same or different materials than the negative electrode of the operating flow batteries, although they share a common electrolyte. By contrast, the positive electrode associated with the second aqueous electrolyte of the balancing cell will almost certainly comprise different materials than the positive electrode of the operating flow battery; in this case, the positive electrolyte of the flow battery will almost certainly be compositionally different, and physically separated from, the second electrolyte of the balancing cell.

The terms "negolyte" and "posolyte," generally refer to the electrolytes associated with the negative electrode and positive electrodes, respectively. As used herein, however, the terms "negolyte" and "posolyte" are reserved for the respective electrolytes of the flow battery. As contemplated herein, the negative working electrolyte (negolyte) of the flow battery comprises coordination compounds or metal-ligand coordination compounds. In specific embodiments, the negolyte comprises a metal ligand coordination complex having the following formula:

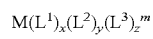

$M(L^1)_x(L^2)_y(L^3)_z^m$ wherein:

M is Al, Ca, Ce, Co, Cr, Fe, Mg, Mn, Mo, Si, Sn, Ti, V, W, Zn, or Zr;

$L^1$, $L^2$, and $L^3$ are each independently ascorbate, a catecholate, citrate, a glycolate or polyol (including ligands derived from ethylene glycol, propylene glycol, or glycerol), gluconate, glycinate, α-hydroxyalkanoate (e.g., α-hydroxyacetate, or from glycolic acid), β-hydroxyalkanoate, γ-hydroxyalkanoate, malate, maleate, phthalate, pyrogallate, sarcosinate, salicylate, or lactate;

x, y, and z are independently 0, 1, 2, or 3, and $1 \le x+y+z \le 3$; and m is +1, 0, −1, −2, −3, −4, or −5.

Related and independent embodiments provide that (a) x=3, y=z=0; (b) x=2, y=1, z=0; (c) x=1, y=1, z=1; (d) x=2, y=1, z=0; (e) x=2, y=z=0; or (f) x=1, y=z=0. In individual preferred embodiments, M is Al, Cr, Fe, or Ti and x+y+z=3. In more preferred embodiments, the negolyte comprises a metal-ligand coordination compound of titanium. In other preferred embodiments, the negolyte comprises a metal-ligand coordination compound of vanadium.

In other embodiments, the redox active material is described in terms of a compound having the formula:

$$M_nTi(L1)(L2)(L3)$$

wherein: L1 is a catecholate, and L2 and L3 are each independently selected from catecholates, ascorbate, citrate, glycolates, a polyol, gluconate, glycinate, hydroxyalkanoates, acetate, formate, benzoates, malate, maleate, phthalates, sarcosinate, salicylate, oxalate, a urea, polyamine, aminophenolates, acetylacetone or lactate; each M is independently Na, Li, or K; n is 0 or an integer from 1-6; and provided that when both L1 and L2 are a catecholate, L3 is not oxalate, urea, catecholate or acetylacetone.

In some embodiments, the catecholate comprises 1,2-dihydroxy benzene, 1,2,3-trihydroxy benzene, 1,2,4-trihydroxy benzene or a mixture thereof. Preferred embodiments include compositions having the formula $$M_nTi(\text{catecholate})_2(\text{hydroxycatecholate}) \text{ or } M_nTi(\text{catecholate})_3.$$

In other embodiments, the redox active composition is or comprises one or more compositions having the formula $$M_nTi(L1)(L2)(L3)$$

wherein: L1 is a catecholate, and L2 and L3 are each independently selected from catecholates, ascorbate, citrate, glycolates, a polyol, gluconate, glycinate, hydroxyalkanoates, acetate, formate, benzoates, malate, maleate, phthalates, sarcosinate, salicylate, oxalate, a urea, polyamine, aminophenolates, acetylacetone or lactate; each M is independently Na, Li, or K; n is 0 or an integer from 1-6. L1, L2, or L3 may also comprise compound having structure according to Formula I, or an oxidized or reduced form thereof:

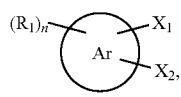

wherein
Ar is a 5-20 membered aromatic moiety, optionally comprising one of more ring O, N, or S heteroatoms;
$X_1$ and $X_2$ are independently —OH, —NHR$_2$, —SH, or an anion thereof, $X_1$ and $X_2$ being positioned ortho to one another;
$R_1$ is independently at each occurrence H, $C_{1-6}$ alkoxy, $C_{1-6}$ alkyl, $C_{1-6}$ alkenyl, $C_{1-6}$ alkynyl, 5-6 membered aryl or heteroaryl, a boric acid or a salt thereof, carboxy acid or a salt thereof, carboxylate, cyano, halo, hydroxyl, nitro, sulfonate, sulfonic acid or a salt thereof, phosphonate, phosphonic acid or a salt thereof, or a polyglycol (preferably polyethylene glycol);
$R_2$ is independently H or $C_{1-3}$ alkyl; and
n is 0, 1, 2, 3, 4, 5, 6, 7, 8, 9, or 10.

Other suitable active materials may comprise an "organic active material". An organic active material may comprise a molecule or supramolecule that does not contain a transition metal ion. It is further understood that organic active materials are meant to comprise molecules or supramolecules that are dissolved in aqueous solution. Suitable organic active materials are capable of undergoing a change in oxidation state during operation of the electrochemical energy storage system. Accordingly, the molecule or supramolecule may accept or donate an electron during operation of the system.

The terms "a catecholate," "a glycolate," "a polyol", "a hydroxyalkanoate", "a benzoate", "a phthalate", "a urea" and "a polyamine" reflect the fact that these ligands may be optionally substituted with at least one group independently selected from H, $C_{1-6}$ alkoxy, $C_{1-6}$ alkyl, $C_{1-6}$ alkenyl, $C_{1-6}$ alkynyl, 5-6 membered aryl or heteroaryl, a boric acid or a salt thereof, $C_{0-6}$ alkylene-carboxy acid or a salt thereof, cyano, halo, hydroxyl, nitro, sulfonate, sulfonic acid or a salt thereof, phosphonate, phosphonic acid or a salt thereof, or a polyglycol (preferably polyethylene glycol).

Alkanoate includes alpha, beta, and gamma forms. Polyamine includes, but is not limited to, diamines and triamines, such as ethylene diamine, ethylene diamine tetraacetic acid (EDTA), and diethylene triamine pentaacetic acid (DTPA). Catecholate includes all compositions comprising a 1,2-dihydroxy benzene moiety. Such moieties include hydroxy catecholates (including pyrogallate), as well as substituents listed herein. Substituents include, but are not limited to, alkyl, alkenyl, and alkynyl (each refer to branched or linear structures and structures optionally substituted with one or more carboxyl, halo, hydroxyl or other electron withdrawing or electron donating groups. Substituents also include 5-6 membered aryl or heteroaryls include phenyl, pyridinyl, furyl, pyrrolyl, imidazolyl, triazole, or thiophenyl. Electron withdrawing or donating substituents can be added to the periphery of the aromatic rings to modulate the redox potential of the redox active ligands.

The terms "parts per million (ppm)" and "parts per billion (ppb)" are defined on a mass basis, relative to the total mass of the electrolyte solution to which the terms are applied. As described elsewhere herein, the terms "mg/mol" and "µg/mol" refers to the concentration an impurity relative to the amount of the redox active electrolyte in the same redox active electrolyte solution.

The term "stack" or "cell stack" or "electrochemical cell stack" refers to a collection of individual electrochemical cells that are electrically connected. The cells may be electrically connected in series or in parallel. The cells may or may not be fluidly connected.

Aspects

Aspect 1: A method for preparing an electrolyte solution having reduced impurity levels, the method comprising
a. electrochemically reducing an impurity, the impurity being present at an initial concentration in an initial electrolyte solution, the initial electrolyte solution further comprising a redox active electrolyte at a concentration of at least 0.5 M, under conditions sufficient to generate an electrochemically treated electrolyte solution containing a reduced form of the redox active electrolyte and a reduced form of the impurity;
b. separating the reduced form of the impurity from the electrochemically treated solution,
so as to provide a final electrolyte solution having a final concentration of the impurity that is less than the initial concentration of the impurity.

Aspect 2. The method of aspect 1, wherein the final concentration of the impurity in the final electrolyte solution is at a pre-determined threshold level is:
(i) less than about 10 mg/L, less than 5 mg/L, less than 2.5 mg/L, less than 1 mg/L, less than 500 µg/L, less than 250 µg/L, less than 100 µg/L, less than 50 µg/L, less than about 40 µg/L, less than about 30 µg/L, less than about 20 µg/L, less than about 10 µg/L, less than about 5 µg/L, or less than about 1 µg/L of one or more of a given impurity; or (ii) less than about 10 mg impurity per mol of the redox active electrolyte in the redox active electrolyte solution ("mg/mol"), less than 5 mg/mol, less than 2.5 mg/mol, less than 1 mg/mol, less than 500 µg/mol, less than 250 µg/mol, less than 100 µg/mol, less than 50 µg/mol, less than about 40 µg/mol, less than about 30 µg/mol, less than about 20 µg/mol, less than about 10 µg/mol, less than about 5 µg/mol, or less than about 1 µg/mol of one or more of a given impurity Aspect 3. The method of aspect 1 or 2, wherein the impurity comprises a form of antimony, arsenic, germanium, tin, or a combination thereof.

Aspect 4. The method of any one of aspects 1 to 3, wherein the electrochemical treatment is performed in an electrochemical cell.

Aspect 5. The method of aspect 4, wherein the reduced form of the impurity is separated by plating within a cathode of the electrochemical cell.

Aspect 6. The method of any one of the aspects 1 to 5, wherein the reduced form of the impurity precipitates from the electrochemically treated electrolyte solution.

Aspect 7. The method of aspect 6, wherein the precipitated reduced form of the impurity is removed by filtration.

Aspect 8. The method of any one of aspects 1 to 4, wherein the reduced form of the impurity is a volatile hydride.

Aspect 9. The method of aspect 8, wherein the volatile hydride is arsine ($AsH_3$), germane ($GeH_4$), stannane ($SnH_4$), stibine ($SbH_3$), or a combination thereof.

Aspect 10. The method of any one of aspects 1 to 9, wherein the electrochemical treatment is an electrochemical reduction is performed at an oxidation reduction potential that is more negative than the reduction potential of the impurity.

Aspect 11. The method of any one of aspects 1 to 10 further comprising conditioning the electrochemically treated electrolyte solution by:
(a) heating the electrochemically treated electrolyte solution at a temperature in a range of from 20° C. to about 105° C.;
(b) purging the electrochemically treated electrolyte solution or the heated solution of (a) using an inert gas; or
(c) a combination of (a) and (b).

Aspect 12. The method of aspect 11, wherein the temperature of the heating step (a) is in a range of from about 35° C. to about 95° C., or more preferably about 45° C. to about 85° C.

Aspect 13. The method of aspect 11 or 12, wherein the inert gas is nitrogen or argon Aspect 14. The method of any one of aspects 11 to 13, wherein steps (a) and (b) are performed simultaneously.

Aspect 15. The method of any one of aspects 11 to 13, wherein steps (a) and (b) are performed sequentially.

Aspect 16. The method of any one of aspects 1 to 15, further comprising oxidizing the reduced form of the redox active electrolyte in the final electrolyte solution.

Aspect 17. The method of aspect 16, wherein the oxidizing is performed by purging the final electrolyte solution with an oxidant, such as oxygen, preferably air.

Aspect 18. The method of any one of aspects 1 to 15, wherein the oxidizing is done using hydrogen peroxide.

Aspect 19. The method of any one of aspects 16 to 18, wherein the oxidizing is performed while heating the final electrolyte solution.

Aspect 20. The method of aspect 16 or 19, wherein the oxidizing is performed at a temperature of about 65° C. or greater, preferably at a temperature of about 85° C. or greater, more preferably at a temperature of about 105° C. or greater.

Aspect 21. The method of aspect 19, wherein the oxidizing is performed using a hydrogen evolution catalyst.

Aspect 22. The method of aspect 21, wherein the hydrogen evolution catalyst is activated carbon, carbon cloth, carbon felt, carbon paper, Ti mesh, Ti felt, expanded Ti mesh, Pt-plated Ti mesh, or a combination thereof.

Aspect 23. The method of any one of aspects 1 to 22, wherein the redox active electrolyte comprises:
(i) a metal ligand coordination compound comprising Al, Ca, Co, Cr, Sr, Cu, Fe, Mg, Mn, Mo, Ni, Pd, Pt, Ru, Sn, Ti, V, Zn, or Zr;
(ii) an organic active material, preferably carbon, an aromatic hydrocarbon such as a quinone, hydroquinone, viologen, pyridinium, pyridine, acridinium, or catechol; or
(iii) a combination of (i) or (ii).

Aspect 24. The method of aspect 23, wherein the redox active electrolyte comprises a metal ligand coordination compound comprising set Co, Cr, Cu, Fe, Mn, Mo, Ru, Sn, Ti, V, or Zr.

Aspect 25. An electrolyte solution prepared according to the method of any one of aspects 1 to 24.

Aspect 26. An electrolyte solution comprising:
(i) a redox active electrolyte at a concentration of at least 0.5 M, preferably comprising a metal or metalloid, more preferably a metal ligand coordination compound comprising titanium; and
(ii) an impurity, the impurity being present in an amount less than about 500 µg per liter of the electrolyte solution or less than 500 µg per mole of the redox active electrolyte.

Aspect 27. The electrolyte solution of aspect 25 or 26, comprising less than about 50 µg/L of one or more of As, Ge, Hg, and Sb.

Aspect 28. The electrolyte solution of any one of aspects 25 to 27, comprising less than about 20 µg/L, less than about 15 µg/L, less than about 10 µg/L, or less than about 5 µg/L of a form of any one of antimony, arsenic, germanium, tin, or a combination thereof.

Aspect 29. The electrolyte solution of any one of aspects 25 to 28, comprising less than about 5 µg/L of one or more of antimony, arsenic, germanium, tin, or a combination thereof.

Aspect 30. An electrochemical cell comprising the electrolyte solution of any one of aspects 25 to 29.

Aspect 31. A redox flow battery comprising at least one electrochemical cell of aspect 30.

Aspect 32. An electrochemical cell comprising a first and second half-cell chamber separated by a cation exchange membrane, wherein:
the first half-cell chamber comprises a first electrode, preferably a carbon electrode, in contact with a first aqueous electrolyte containing a redox active material and a reducible impurity; and
the second half-cell chamber comprises a second electrode in contact with a second aqueous electrolyte, the second aqueous electrolyte comprising one or more salts comprising a non-protic cations at a concentration of at least 0.1 M, the second electrode comprising a catalyst for the generation of $O_2$, preferably comprising nickel such as Ni foam, stainless steel mesh, stainless steel felt, Ni oxide, Ni hydroxide, Ni oxy-hydroxide, or Ni—Fe oxide.

Aspect 33. An electrochemical cell comprises a first and second half-cell chamber separated by a cation exchange membrane, wherein:

the first half-cell chamber comprises a first electrode, preferably a carbon electrode such as carbon cloth, carbon felt, or carbon paper, in contact with a first aqueous electrolyte containing a redox active material and a reducible impurity; and the second half-cell chamber comprises a second electrode in contact with a second aqueous electrolyte having a pH of at least 2 and comprising one or more salts having non-protic cations at a concentration of at least 0.1 M, said second electrode comprising a catalyst for the generation of $O_2$, preferably at least one of platinum or an oxide of cobalt, iridium, iron, manganese, nickel, ruthenium, tin, or a combination thereof, most preferably $IrO_2$.

Aspect 34. The electrochemical cell of aspects 32 or 33, wherein the reducible impurity forms a volatile reduced form on electrochemical reduction, for example an arsine ($AsH_3$), germane ($GeH_4$), stannane ($SnH_4$), or stibine ($SbH_3$).

Aspect 35. The electrochemical device of any one of aspects 32 to 34, wherein the second aqueous electrolyte comprises $Na^+$ and/or $K^+$ ions and has a pH of at least 7.

Aspect 36. A method of operating the electrochemical device of any one of aspects 32 to 35, comprising passing sufficient electrical current through the cell under conditions sufficient to reduce the concentration of the reducible impurity in the first aqueous electrolyte to a pre-determined level, preferably less than 10 µg/L, in the first aqueous electrolyte.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1

As described above, in certain embodiments, the electrochemical cell comprises a first and second half-cell chamber separated by a membrane, wherein:

the first half-cell chamber comprises a first electrode, preferably a carbon electrode such as carbon cloth, carbon felt, or carbon paper, in contact with a first aqueous electrolyte containing a redox active electrolyte (e.g., a negolyte) and a reducible impurity; and the second half-cell chamber comprises a second electrode in contact with a second aqueous solution, preferably acidic, but having a pH of at least 2, said second electrode comprising a catalyst for the generation of $O_2$, preferably at least one of platinum or an oxide of cobalt, iridium, iron, manganese, nickel, ruthenium, tin, or a combination thereof, most preferably $IrO_2$.

Figure 3A:
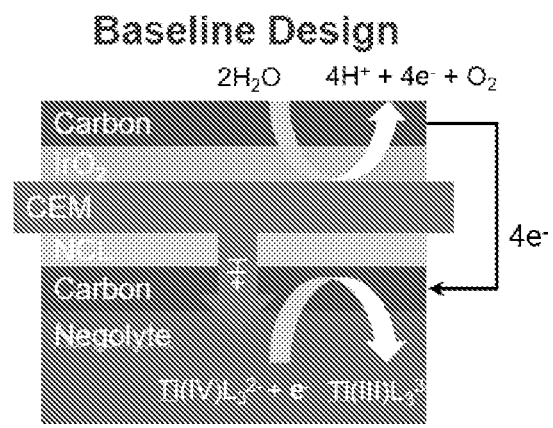
FIG. 3(A) exemplifies a class of device configurations where the second electrolyte is acidic, the membrane assembly comprises a cation exchange membrane (CEM) with an associated non-conductive layer (NCL), such as described in International Application No. PCT/US2018/054798, the contents of which are incorporated by reference herein in their entireties, or at least for the design and operating conditions of the disclosed devices. Note that this embodiment injects protons ($H^+$) into the redox electrolyte being treated (as shown here, but is not limited to using metal ligand coordination compounds comprising titanium), the injection of protons decreasing the pH of the electrolyte solution as described elsewhere herein. Further note that the electrode acidic second electrolyte is shown as $IrO_2$, as exemplary of the more general metal oxide electrodes described elsewhere herein.

To demonstrate exemplary embodiments in this context, experiments have been conducted in which an iridium oxide catalyst coated on a cation exchange membrane with a carbon electrode was used as the anode, a carbon cloth was used as the cathode that was separated from the membrane by a non-conducting layer. (See FIG. 3(A)) The non-conductive layer consisted of an electronically insulating, but fluid-permeable material such as a grid or foam. Melamine foam has been found to be useful for the operation of this non-conductive layer. The non-conductive layer separated the negolyte reduction from the flow of acid from the anode, which can cause negolyte degradation, as described elsewhere herein. In this configuration, the electrochemical cell was used as a flow cell where the redox active electrolyte (negolyte) solution comprising a titanium ligand coordination compound (e.g., a titanium-catecholate complex) was flowed over the cathode. The water for the anode was supplied by diffusion from the negolyte solution. In practice, this design has thus far been limited to charging redox active electrolyte solution at a current density of about 30 or 40 mA per square centimeter. The current density appeared to be limited by acid transport to the cathode causing degradation of the titanium complex. Despite these initial limitations, such a configuration has been demonstrated to provide proof-of-concept for the principles described herein, providing final redox active electrolyte solutions comprising titanium-catecholate complexes at concentrations in excess of 0.7 M, with arsenic as an exemplary impurity at levels less than 10 µg/L.

Example 2

As described above, in certain other embodiments, the electrochemical cell comprises a first and second half-cell chamber separated by a membrane, wherein:

the first half-cell chamber comprises a first electrode, preferably a carbon electrode, in contact with a first aqueous electrolyte containing a redox active material and a reducible impurity; and the second half-cell chamber comprises a second electrode in contact with a second aqueous alkaline (anolyte) solution, said second electrode comprising a catalyst for the generation of $O_2$, preferably comprising nickel such as Ni foam, stainless steel mesh, stainless steel felt, Ni oxide, Ni hydroxide, Ni oxy-hydroxide, or Ni—Fe oxide.

Figure 3B:
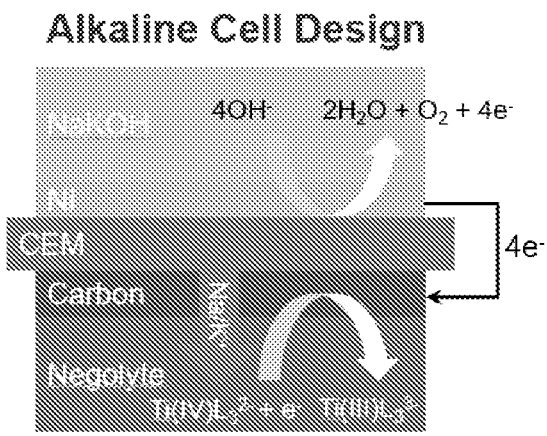
FIG. 3(B) exemplifies a second class of device configurations where the second electrolyte is alkaline, allowing the use of less expensive electrode catalysts (exemplified here as Ni). The presence and injections of alkali metal cations (exemplified here as $Na^+/K^+$ mixtures), allows for the injection of electrons without changing the pH of the redox electrolyte being treated.
Figure 3C:
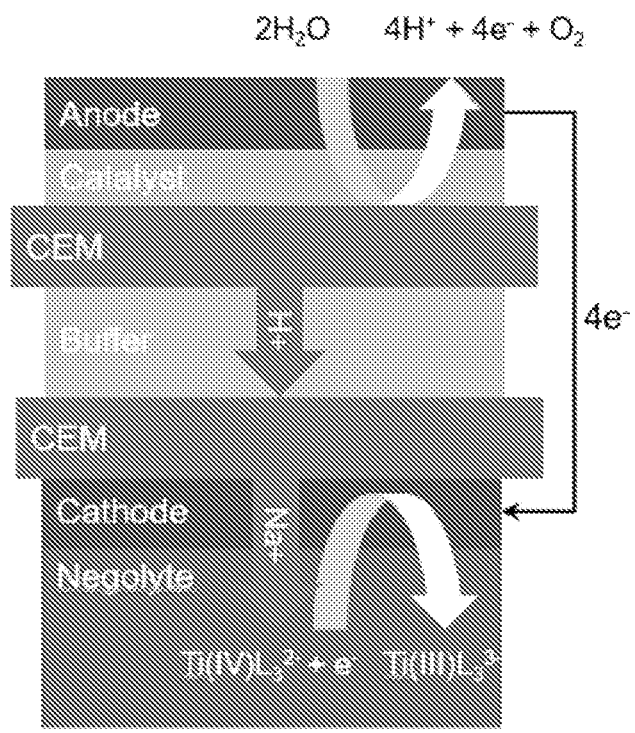
FIG. 3(C) exemplifies a third class of device configurations. In this design, a carbon anode with an iridium oxide catalyst is used versus a carbon cathode. The anode is separated from the cathode by two cation exchange membranes, which form a third compartment. In the third compartment, a strongly buffered alkaline solution converts the proton current generated by the anode into an alkali metal ion current. This architecture prevents the proton current from degrading the negolyte but requires a more complicated cell design.

In exemplary embodiments in this context, the anolyte solution was a concentrated solution of sodium hydroxide, potassium hydroxide, phosphate buffer, or a mixture thereof (see FIG. 3(B)). The anode consisted of a common alkaline oxidation catalyst, in these cases nickel or nickel coated steel. The cathode was a carbon electrode. The cathode and anode were separated by a cation exchange membrane, for example NAFION™ perfluorosulfonic acid resins or sulfonated polyether ether ketone (s-PEEK). This cell was also designed as a flow cell, where both the redox active electrolyte (negolyte) solution comprising a titanium ligand coordination compound (e.g., a titanium-catecholate complex) and anolyte solutions were pumped through the cell. Again, acceptable results were achieved, as described in Example 1.

Example 3

A 25 $cm^2$ HERM device was constructed using a Ni foam anode (346 $g/m^2$, 1.6 mm thickness, Porosity: ≥95%, 80-110 ppi; MTI Inc,), a Nafion N117 cation-exchange membrane, and a carbon cloth cathode. 1M KOH was used as an anolyte. The device was used to purify a Ti-catecholate negolyte with 1.2 M concentration, containing 3.1 ppm As and 2.9 ppm Sn, as measured by ICP-OES. Charging of the negolyte proceeded at 180 $mA/cm^2$ to a solution potential of −1.36 V vs Ag/AgCl. The electrolyte was conditioned by sparging with nitrogen and magnetic stirring at 45° C. for 16 hours, followed by refluxing of the electrolyte and further nitrogen sparging for 20 hours. At the conclusion of these conditioning steps, ICP-OES found less than 1.0 ppb As and 1.6 ppm Sn, representing decreases of the concentrations of these impurities by >99% and 45%, respectively.

Example 4

A 25 cm$^2$ HERM device was constructed using a carbon cloth anode facing an IrO$_2$-coated surface of a Nafion N117 membrane. A melamine foam non-conductive layer was placed between the membrane and the carbon cloth cathode. The device was used to purify a Ti-catecholate negolyte with 1.2 M concentration, containing 3.1 ppm As. Charging of the negolyte proceeded at 40 mA/cm$^2$ to a solution potential of −1.34 V vs Ag/AgCl. The electrolyte was conditioned by sparging with nitrogen and magnetic stirring at 65° C. for 2.5 hours. After this conditioning step, the electrolyte was found to contain 6.7 ppb As, a reduction in As concentration of >99%.

Example 5

Figure 4:
FIG. 4 shows the cathode described in Example 5, after electrochemical reduction.

A Ti-catecholate negolyte with 1.2 M concentration contaminated with greater than 20 mg/L of Zn was purified. Charging this electrolyte to −1.42 V vs. Ag/AgCl resulted in extensive Zn plating on the carbon cathode of the HERM device. (FIG. 4 shows Zn plated on HERM cathode)

As those skilled in the art will appreciate, numerous modifications and variations of the present invention are possible in light of these teachings, and all such are contemplated hereby.

The disclosures of each patent, patent application, and publication cited or described in this document are hereby incorporated herein by reference, each in its entirety, for all purposes.

What is claimed is:

1. A method for preparing an electrolyte solution having reduced impurity levels, the method comprising:
   a. electrochemically reducing an impurity in an initial electrolyte solution, the initial electrolyte solution further comprising a redox active electrolyte at a concentration of at least 0.5 M, under conditions sufficient to generate an electrochemically treated electrolyte solution containing a reduced form of the redox active electrolyte and a reduced form of the impurity, wherein the redox active electrolyte comprises a metal ligand coordination compound comprising Al, Ca, Co, Cr, Sr, Cu, Fe, Mg, Mn, Mo, Ni, Pd, Pt, Ru, Sn, Ti, V, Zn, or Zr;
   b. heating the electrochemically treated electrolyte solution at a temperature in a range of from 20° C. to about 105° C.;
   c. purging the electrochemically treated electrolyte solution; and
   d. separating the reduced form of the impurity from the electrochemically treated solution,
   so as to provide a final electrolyte solution having a final concentration of the impurity that is less than about 10 mg/L or less than about 10 mg impurity per mol of the redox active electrolyte in the redox active electrolyte solution ("mg/mol").

2. The method of claim 1, wherein the final concentration of the impurity in the final electrolyte solution is:
   (i) less than 5 mg/L, less than 2.5 mg/L, less than 1 mg/L, less than 500 μg/L, less than 250 μg/L, less than 100 μg/L, less than 50 μg/L, less than about 40 μg/L, less than about 30 μg/L, less than about 20 μg/L, less than about 10 μg/L, less than about 5 μg/L, or less than about 1 μg/L of one or more of a given impurity; or
   (ii) less than 5 mg/mol, less than 2.5 mg/mol, less than 1 mg/mol, less than 500 μg/mol, less than 250 μg/mol, less than 100 μg/mol, less than 50 μg/mol, less than about 40 μg/mol, less than about 30 μg/mol, less than about 20 μg/mol, less than about 10 μg/mol, less than about 5 μg/mol, or less than about 1 μg/mol of one or more of a given impurity.

3. The method of claim 1, wherein the impurity comprises a form of antimony, arsenic, germanium, tin, or a combination thereof.

4. The method of claim 1, wherein the electrochemical treatment is performed in an electrochemical cell.

5. The method of claim 4, wherein the reduced form of the impurity is separated by plating within the cathode of the electrochemical cell.

6. The method of claim 1, wherein the reduced form of the impurity precipitates from the electrochemically treated electrolyte solution.

7. The method of claim 6, wherein the precipitated reduced form of the impurity is removed by filtration.

8. The method of claim 1, wherein the reduced form of the impurity is a volatile hydride.

9. The method of claim 8, wherein the volatile hydride is arsine (AsH$_3$), germane (GeH$_4$), stannane (SnH$_4$), stibine (SbH$_3$), or a combination thereof.

10. The method of claim 1, wherein the electrochemical treatment is an electrochemical reduction is performed at an oxidation reduction potential that is more negative than the reduction potential of the impurity.

11. The method of claim 1, wherein the temperature of the heating step (a) is in a range of about 35° C. to about 95° C.

12. The method of claim 1, wherein the inert gas is nitrogen or argon.

13. The method of claim 1, wherein steps a and b are performed simultaneously.

14. The method of claim 1, wherein steps a and b are performed sequentially.

15. The method of claim 1, further comprising oxidizing the reduced form of the redox active electrolyte in the final electrolyte solution.

16. The method of claim 15, wherein the oxidizing is performed by purging the final electrolyte solution with an oxidant.

17. The method of claim 15, wherein the oxidizing is done using hydrogen peroxide.

18. The method of claim 15, wherein the oxidizing is performed while heating the final electrolyte solution.

19. The method of claim 15, wherein the oxidizing is performed at a temperature of about 65° C. or greater, preferably at a temperature of about 85° C. or greater, more preferably at a temperature of about 105° C. or greater.

20. The method of claim 18, wherein the oxidizing is performed using a hydrogen evolution catalyst.

21. The method of claim 20, wherein the hydrogen evolution catalyst is activated carbon, carbon cloth, carbon felt, carbon paper, Ti mesh, Ti felt, expanded Ti mesh, Pt-plated Ti mesh, or a combination thereof.

22. The method of claim 1, wherein the redox active electrolyte comprises a metal ligand coordination compound comprising Co, Cr, Cu, Fe, Mn, Mo, Ru, Sn, Ti, V, or Zr.

23. An electrolyte solution prepared according to the method of claim 1.

24. The method of claim 15, wherein the redox active electrolyte further comprises an organic active material.

25. The method of claim 24, wherein the organic active material is carbon or an aromatic hydrocarbon.

26. The method of claim 25, wherein the aromatic hydrocarbon is a quinone, hydroquinone, viologen, pyridinium, pyridine, acridinium, or catechol.

27. The method of claim 1, wherein the temperature of the heating is in a range of about 45° C. to about 85° C.

28. The method of claim 16, wherein the oxidant is oxygen.

* * * * *